March 17, 1964
L. R. SODERBERG
3,125,313
AIRCRAFT CONTROL MEANS
Filed Nov. 16, 1962
2 Sheets-Sheet 1
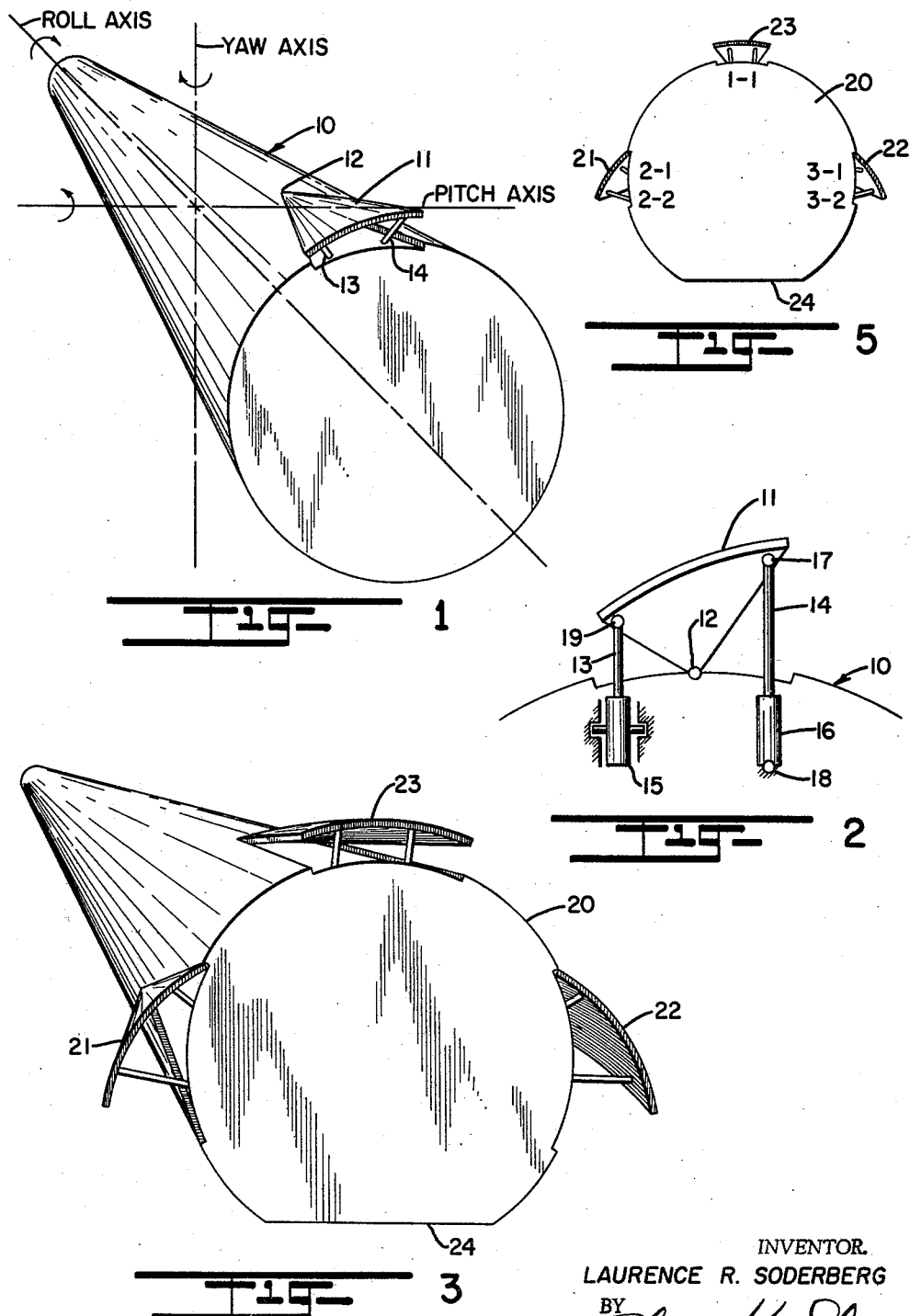
INVENTOR.
LAURENCE R. SODERBERG
BY
ATTORNEY

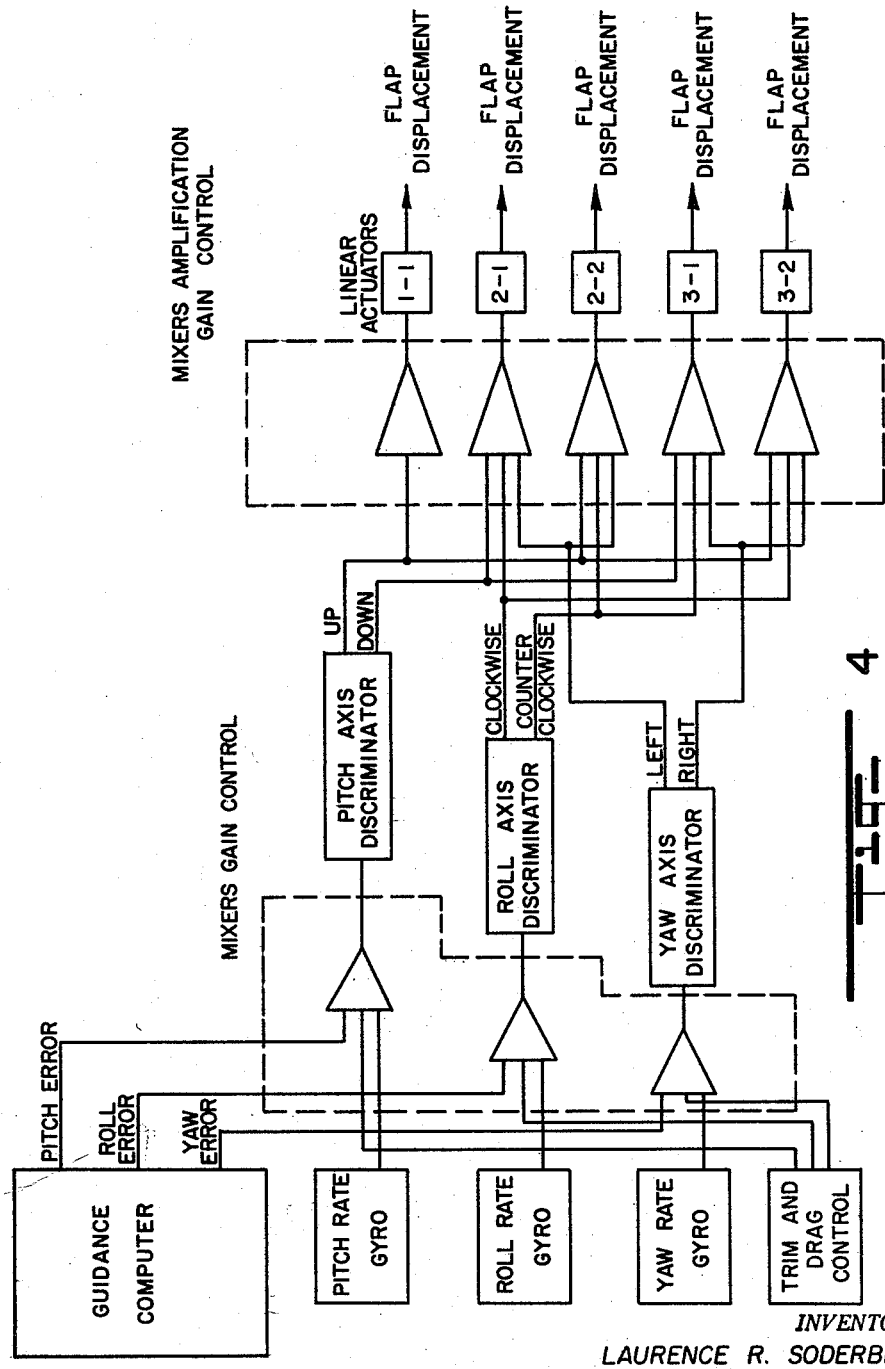

United States Patent Office 3,125,313
Patented Mar. 17, 1964

3,125,313
AIRCRAFT CONTROL MEANS
Laurence R. Soderberg, Broomfield, Colo., assignor to Martin-Marietta Corporation, Baltimore, Md., a corporation of Maryland
Filed Nov. 16, 1962, Ser. No. 238,105
9 Claims. (Cl. 244—87)

This invention is directed to three-axis aerodynamic control means, and particularly to the use of body-flap type control surfaces to achieve aerodynamic control of atmospheric re-entry bodies about the pitch, yaw and roll axes.

Body flaps have been suggested and tested in wind tunnels for aerodynamic control of re-entry bodies and vehicles, and are in use on aircraft of various types. Such prior designs of body flaps generally are constructed for single-axis deflection. Such conventional (non-tilting) flaps can be arranged to achieve control moments about all three axes of a general body shape by using a plurality of flaps for each separate control function. For example, roll control can be achieved by opposite single-axis deflection of paired flaps. Prior designs of body flaps however, when applied on a body of revolution such as a cone, cannot produce rolling moments when displaced outward from the axis of symmetry containing the center of gravity; because such prior designs lack the tilting feature which causes the resultant aerodynamic force on the flap to be displaced from passing through the axis of symmetry.

Body flaps capable of satisfactorily controlling a re-entry body, or other aircraft, aerodynamically along three axes would be highly desirable. If the engineering problems of such a three-axis design could be suitably solved, it would possess many important advantages such as compactness, simplicity of construction, minimum weight, etc.

Accordingly, it is an important object of this invention to provide control surface means, such as body flaps, capable of adjustment along three axes to achieve roll control, along with pitch and yaw control, of a re-entry body or aircraft.

Another object of this invention is to provide three-axis aerodynamic control means of technically feasible design for use on re-entry vehicles.

Additional objects of this invention will become apparent from the following description, which is given primarily for purposes of illustration, and not limitation.

Stated in general terms, the objects of this invention are attained by providing control surfaces, such as the planar body-flap type, which preferably are made of generally triangular configuration. The apex portion of the control surface, or flap, preferably is pivotally attached upstream on the re-entry body or vehicle so that it can move around three orthogonal axes for roll, pitch and yaw control of the body. A ball joint has been found to be suitable for this purpose. The trailing base region of the control surface is provided with at least two spaced actuators, preferably positioned at one of the corner portions of the base region. The spaced actuators preferably are adapted for independent displacement so that the degree of tilting of the control surface can be varied at will. Also, ball joints preferably are used as attachment means between the actuators and the control surfaces for maximum tilting movement of the surfaces. The actuators can be energized by hydraulic or pneumatic means. In addition, the control surfaces can be restrained or reinforced against lateral movement relative to the re-entry body shape, for example, by the use of suitable auxiliary strengthening means.

A more detailed description of specific embodiments of this invention is given below with reference to the accompanying drawings, wherein:

FIG. 1 is a perspective view schematically showing a re-entry body provided with a tilting body flap in accordance with the invention;

FIG. 2 is a partial perspective rear view schematically showing structural details of a specific embodiment of a tilting body flap of the invention;

FIG. 3 is a view similar to that of FIG. 1 showing the use of a generally rectangular top body flap and two triangular side body flaps on a conical body having a flat bottom portion;

FIG. 4 is a schematic block diagram of an auxiliary electronic control system applied to the re-entry body and surface controls of FIG. 3; and FIG. 5 is a rear view of FIG. 3 showing symbols assigned for use with the block diagram of FIG. 4.

In FIG. 1 the device of the invention is applied to a conical re-entry body 10 to achieve aerodynamic control of atmospheric re-entry of the body about the roll, pitch and yaw axes. The device in this specific embodiment is a triangular tilting body flap 11. Although the re-entry body 10 is shown as a blunted cone in this specific embodiment, it will be understood that the invention can be applied to a re-entry body of any desired shape.

A plurality of any desired number of body flaps 11 can be employed. For example, three body flaps 11, spaced 120°; four body flaps spaced 90°, etc.; can be employed on re-entry body 10. Each body flap 11 is hinged, or pivotally attached at its apex 12 upstream on the body 10 so that the trailing edge, or base, of the flap can be deflected or displaced by actuators 13 and 14 into the airstream.

When all of the body flaps 11 are deflected at the same time, in the proper manner or orientation relative to the surface of body 10, they achieve aerodynamic control of the body, during re-entry, about the pitch and yaw axes. In addition, the body flaps 11 are so hinged or pivoted at apex 12 and deflected by actuators 13 and 14, as shown in FIG. 1, that they tilt so as to be non-parallel, or angular, relative to the adjacent surface of re-entry body 10. Thus by differential operation of multiple tilted flaps 11, an aerodynamic rolling moment is applied to body 10, for roll control thereof.

It will be understood that roll control of body 10 can, alternatively, be achieved by appropriately tilting only one of a group of body flaps 11, instead of tilting the entire group. Also, individual body flaps 11 can be tilted at different degrees, if desired, instead of at equal degrees. In any case, by pushing the tilting edge of a body flap 11 outward, the plane of the three support points at apex 12 and actuators 13 and 14, can be oriented in any tilted position to thus achieve roll, pitch and yaw control simultaneously by body flap 11 in body 10.

In FIG. 2 is shown schematically in more detail, the use of a pin-mounted "floating" hydraulic actuator 15 for energizing one of the actuators 13 and a ball-joint mounted "floating" hydraulic actuator 16 for energizing the other actuator 14. The use of the type of mounting of the actuators 13 and 14 is designed to impart lateral stability to the body flap 11 relative to the re-entry body 10, for example. Actuator rod 13 rotates only in the fore-and-aft plane of body 10 because it is restrained by the pin-mounted hydraulic actuator from any movement in the lateral plane. Thus any lateral displacement of the body flap 11 by any side load is restrained by the cantilever pin-mounting of hydraulic actuator 15 and actuator rod 13. Actuator rod 14 is free to rotate both in the fore-and-aft plane and in the lateral plane by virtue of ball-joint 17 attaching the rod to flap 11 and ball-joint 18 attaching hydraulic actuator 16 to body 10. Actuator rod 13 also is attached to flap 11 by a ball-joint 19.

It will be understood that other restraining means can be used to prevent lateral movement of the body flaps 11. For example, a third actuator rod or stabilizing bar, designed to absorb side loads, can be used to prevent lateral flap movement.

Although the device of the invention has been described above as applied to simultaneous roll, pitch and yaw control of a re-entry body by appropriate deflection and tilting of body flaps 11, it will be understood that there are other applications for the invention. In general, the device of the invention is an advantageous substitute for the use of fins, side jets, reaction controls, and the like on aircraft or airborne vehicles or bodies. For example, canard-mounted trimming flaps have been used for high speed aircraft or lifting bodies. The tilting body flap concept of the instant invention can be applied as a substitute for such canard-mounted trimming flaps with the important advantage that the tilting body flap can provide lateral-directional trimming in addition to basic pitch control.

Similarly, although the device of the invention was shown and described hereinabove as being attached to a re-entry body by push-rod linkages, it will be understood that other mechanical means can be used to provide both deflection and tilt to a body flap; that is, rotation of a control surface about two orthogonal axes, to achieve roll control along with pitch and yaw control by the use of a single control surface. The particular choice of mechanical attachment or mounting means for the control surface, or body flap depends upon the means which imparts a minimum of complexity to the internal structure and arrangement of mechanisms inside the re-entry vehicle. Basically, the kinematic problem of deflecting and tilting a control surface or body flap about two orthogonal axes is reducible to the two-axis gimbal principle. In some applications of the device of this invention, the gimbal ring arrangement will prove to be superior to the push-rod linkage in certain respects.

The device of the invention also is applicable to movement of bodies through water. Nuclear propulsion power and improved hydrodynamic design are pushing the submarine, for example, to sustained high speed. Under such high speeds, turns are coordinated in roll, pitch and yaw as in the case of air travel. Tilting and deflecting control surfaces or body flaps are applicable to the control of such high speed submersibles.

A more detailed and complete description of a control system applied to a specific embodiment of the type shown in FIG. 1 and described in connection therewith, is given below with reference to FIGS. 3, 4 and 5.

FIGURE 3 shows a lifting re-entry body which is characterized by a high ballistic coefficient, $W/C_DA$, with moderate hypersonic lift-to-drag ratio. These characteristics have advantages for certain lifting re-entry applications. Basically the configuration is a silghtly-blunted right circular cone 20 having a small semi-apex angle (on the order of 5-10 degrees).

The tilting body flaps, 21 and 22, are mounted on the sides of the cone base and are used in conjunction with a conventional body flap 23 placed on the top of the cone base. Pitch control is achieved by deflection of flap 23 alone or by simultaneous deflection of flaps 21, 22, and 23. When flaps 22 and 21 are used to provide pitch control, the lower or upper edges of flaps 21 and 22 are deflected outwardly through equal displacements. Yaw control is achieved by differential operation of 21 and 22. For a pure yawing moment, flaps 21 and 22 are displaced outwardly unequal amounts, but in an untilted attitude from the rear view. Roll control is achieved by differential tilting of flaps 21 and 22. For a pure rolling moment flaps 21 and 22 are tilted equally in opposite directions. It is seen that by suitable mixing, any combination of desired pitch, yaw, and rolling moment can be achieved. It is also possible to deflect all flaps 21, 22, and 23 in such a way that all moments cancel each other and pure drag modulation is achieved; i.e., the flaps act as drag brakes. For this mode flaps 21 and 22 are deflected to produce a pitch-down moment, counteracting the pitch-up moment caused by deflection of flap 23.

Another feature of the re-entry vehicle design is the flattened bottom surface 24. The objective here is to reduce the pitch control deflection required to trim the vehicle at the angle-of-attack for maximum lift coefficient. This flattening 24 is shown to be a plane surface typically; however, a curved surface might prove to be superior aerodynamically.

Although base drag may be small at hypersonic speeds, another feature (not shown) which could improve the maximum lift-to-drag ratio would be chamfering or boat-tailing of those areas of the cone base 24 lying between the control surfaces 21 and 22 and 23.

A possible control system for this vehicle and its control surfaces is shown in block diagram form in FIGURES 4 and 5. There are many feasible mechanizations of the proposed control device for stabilization and control of a re-entry vehicle. These could range from operation of the surfaces from an integrated guidance and control digital computer to more conventional analog methods. For purposes of illustration a mechanization is presented based completely on current state-of-the-art technology in electronics and gyroscopic components. This example is not intended to represent optimum design of a vehicle re-entry control system, but rather to present an approach which establishes the feasibility of the proposed control equipment.

FIGURE 4 is a block diagram of the illustrative system. The primary system inputs are derived in a re-entry guidance computer. Held sample data D.C. analog voltage signals are assumed. In normal operation rigid body damping signals will be provided by rate gyros in the separate vehicles axes and summed with the attitude errors from the guidance computer. Gain control is provided in this summing amplifier. The resulting signals are then sent through discriminator circuits to separate the positive and negative control surface commands. These circuits could be of the diode "steering" type if extremely low thresholds are not required, or full transistor amplifiers if dead band size is critical. These separated signals are then routed to mixer amplifiers for the appropriate servo actuators. Further gain control can be supplied at this summation in the event of requiring different response in the separate loops. The resulting voltages are used to control linear displacement actuators to position the control flaps.

In addition to vehicle attitude control, it is anticipated that trim and drag control will be required. This can be simply provided by inserting bias voltages in the mixer amplifiers summing the guidance commands and rate gyro signals. Trim commands could be computed in the guidance system or in auxiliary electronics as shown in FIGURE 4. Drag control can be easily provided by bias voltages of programmed proportionality to deflect the surfaces so that moments would cancel.

Although linear actuators are indicated in the illustrative system it would appear to be feasible to utilize a force balance actuation system. This approach would undoubtedly simplify the electronics for gain control since the flap deflection for a given actuator force would be a function of dynamic pressure. This would reduce the necessity of controlling the independent loop gain as a function of this dynamic pressure as is required when displacement actuators are used.

Obviously many other modifications and variations of the present invention are possible in the light of the above teachings. It is, therefore, to be understood that within the scope of the appended claims, the invention can be practiced otherwise than as specifically described.

What is claimed is:

1. A control device for a body moving through a fluid which comprises body flap means provided with a control surface, attachment means for attaching a portion of the body flap means to the body so that the control surface is movable about three orthogonal axes for roll, pitch and yaw control of the body, and displacement means attached to a portion of the body flap means for displacing and tilting the control surface relative to the body shape.

2. A control device for a body moving through a fluid which comprises body flap means provided with a control surface, pivotal attachment means for attaching an upstream portion of the body flap means to the body so that the control surface is movable about three orthogonal axes for roll, pitch and yaw control of the body, and actuator means attached to a trailing portion of the body flap means for displacing and tilting the control surface relative to the body shape.

3. A control device for a body moving through a fluid which comprises body flap means provided with a control surface, pivotal attachment means for attaching an upstream portion of the body flap means to the body so that the control surface is movable about three orthogonal axes for roll, pitch and yaw control of the body, actuator means attached to a trailing portion of the body flap means for displacing the control surface relative to the surface of the body, and a second actuator means attached to the trailing portion of the body flap means for tilting the control surface relative to the surface of the body.

4. A control device for a body moving through a fluid which comprises body flap means provided with a control surface, ball-joint attachment means for attaching an upstream portion of the body flap means to the body so that the control surface is movable about three orthogonal axes for roll, pitch and yaw control of the body, displacement actuator means pivotally attached to a trailing portion of the body flap means for displacing the control surface relative to the surface of the body for pitch and yaw control of the body, and tilting actuator means pivotally attached to a trailing portion of the body flap means for tilting the control surface relative to the surface of the body for roll control of the body.

5. An aerodynamic control device for an airborne body which comprises generally triangular body flap means provided with a control surface, ball-joint attachment means for attaching an apex portion of the body flap means to an upstream portion of the body so that the control surface is movable about three orthogonal axes for roll, pitch and yaw control of the body, displacement actuator means ball-joint attached to one base corner portion of the body flap means for displacing the control surface relative to the surface of the body for pitch and yaw control of the body, and tilting actuator means ball-joint attached to the other base corner portion of the body flap means for tilting the control surface relative to the surface of the body for roll control of the body.

6. An aerodynamic control device according to claim 5, wherein said displacement actuator means and said tilting actuator means are provided with hydraulic activating means and are ball-joint attached to said body.

7. An aerodynamic control device according to claim 5, wherein said displacement actuator means and said tilting actuator means are provided with hydraulic activating means, one of said two actuator means is ball-joint attached to said body and the other actuator means is hingedly attached to said body for movement of the actuator means only in the fore-and-aft plane of said body to restrain lateral movement of said body flap means.

8. An aerodynamic control device according to claim 5, wherein said body flap means is provided with reinforcement means to restrain the flap means against lateral movement relative to said body surface.

9. A control device for a body moving through a fluid which comprises body flap means provided with a control surface, attachment means for attaching a portion of the body flap means to the body so that the control surface is movable about three orthongonal axes for roll, pitch and yaw control of the body, displacement means attached to a portion of the body flap means for displacing the control surface relative to the body shape for pitch and yaw control of the body, tilting means attached to a portion of the body flap means for tilting the control surface relative to the body shape for roll control of the body, and a guidance computer control and servo system coupled with the displacement means and the tilting means for controlling the roll, pitch and yaw of the body.

No references cited.